United States Patent [19]

Kojima

[11] Patent Number: 5,699,409
[45] Date of Patent: Dec. 16, 1997

[54] CORDLESS TELEPHONE SYSTEM FOR PROVIDING SET-UP COMMUNICATIONS BETWEEN SUBSIDIARY UNITS THROUGH A MASTER UNIT

[75] Inventor: Susumu Kojima, Tokyo, Japan

[73] Assignee: NEC Corporation, Tokyo, Japan

[21] Appl. No.: 519,349

[22] Filed: Aug. 25, 1995

[30] Foreign Application Priority Data

Aug. 26, 1994 [JP] Japan .................................. 6-202426

[51] Int. Cl.[6] ........................... H04Q 7/20; H04Q 7/26; H04Q 7/30
[52] U.S. Cl. ................. 379/61; 379/58; 379/63; 455/54.1; 455/54.2
[58] Field of Search ............................. 379/58, 59, 61, 379/63; 455/33.1, 54.1, 54.2

[56] References Cited

U.S. PATENT DOCUMENTS

| | | | |
|---|---|---|---|
| 4,534,061 | 8/1985 | Ulug | 455/54.1 X |
| 5,237,603 | 8/1993 | Yamagata et al. | 379/61 |
| 5,247,567 | 9/1993 | Hirano | 379/61 |
| 5,619,553 | 4/1997 | Young | 379/61 |

FOREIGN PATENT DOCUMENTS

| | | |
|---|---|---|
| 0 635 962 | 1/1995 | European Pat. Off. . |
| 1-136437 | 5/1989 | Japan . |
| 2-241129 | 9/1990 | Japan . |
| 2 226 934 | 7/1990 | United Kingdom . |
| 95/06395 | 3/1995 | WIPO . |

*Primary Examiner*—Dwayne Bost
*Assistant Examiner*—Brian L. Johnson
*Attorney, Agent, or Firm*—Foley & Lardner

[57] ABSTRACT

A cordless telephone system includes a master unit permanently connected to a wire telephone line, and a plurality of subsidiary units connected to the master unit by radio. A calling subsidiary unit includes a transmitter for transmitting a signal for requesting speech communication with another called subsidiary unit to the master unit through a radio channel which is monitored by the master unit, and a transmitter for transmitting a signal for calling the called subsidiary unit to the called subsidiary unit through a speech communication channel through which direct speech communication with the called subsidiary unit can be performed. The master unit includes a transmitter for receiving the signal for requesting speech communication from the calling subsidiary unit and transmitting a signal for requesting direct speech communication between the subsidiary units to the called subsidiary unit through a radio channel which is monitored by the called subsidiary unit. The called subsidiary unit includes transmitter which is started upon reception of the signal for requesting direct speech communication from the master unit, and receives the signal for calling the called subsidiary unit from the calling subsidiary unit through the speech channel.

14 Claims, 5 Drawing Sheets

FIG. I

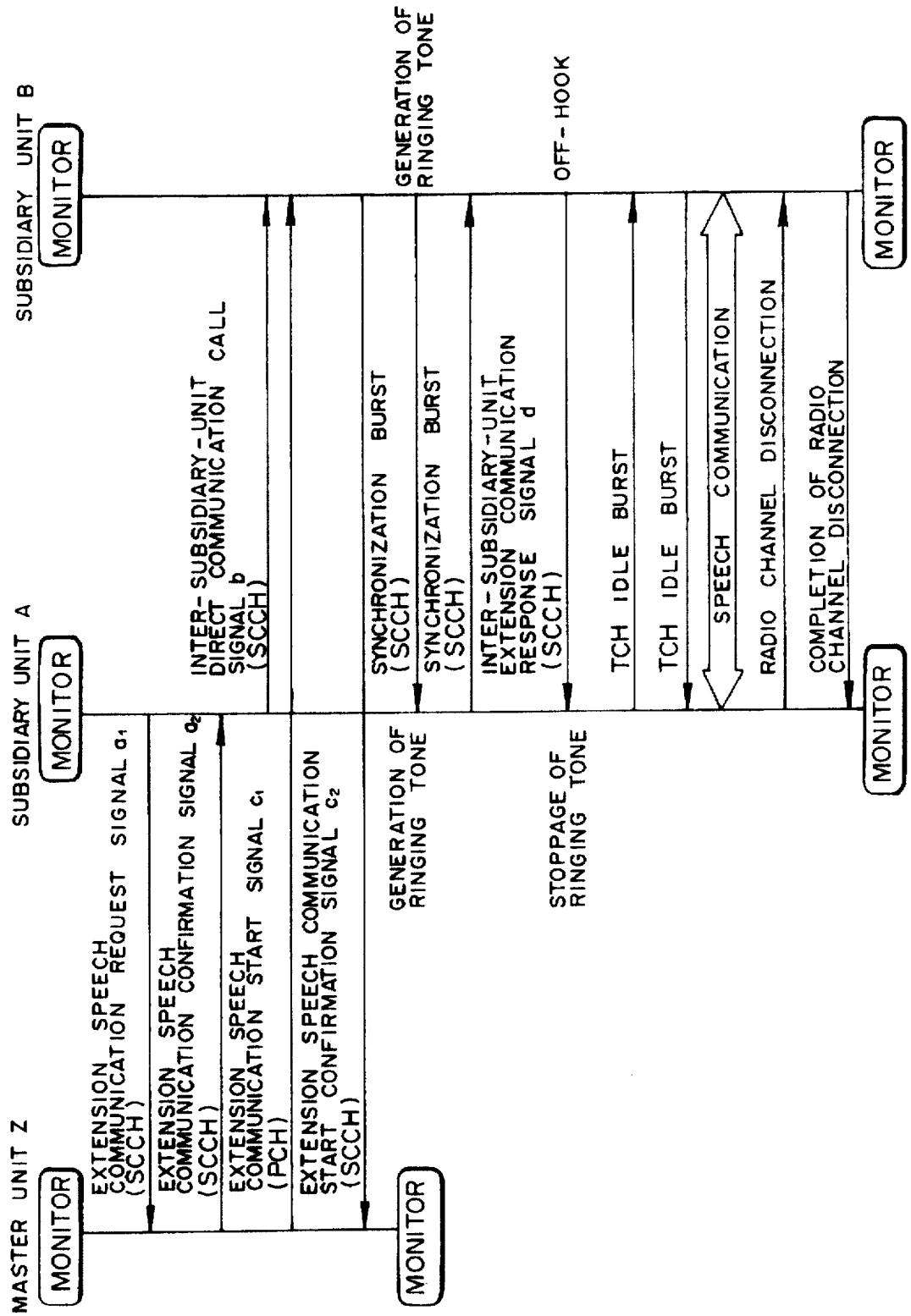

CORDLESS TELEPHONE SYSTEM FOR PROVIDING SET-UP COMMUNICATIONS BETWEEN SUBSIDIARY UNITS THROUGH A MASTER UNIT

BACKGROUND OF THE INVENTION

1. Field of the Invention

The present invention relates to a cordless telephone system capable of inter-subsidiary-unit extension speech communication and, more particularly, to a home digital cordless telephone system which can reduce the battery power consumption and shorten the time required for connection of inter-subsidiary-unit extension speech communication.

2. Description of the Prior Art

Analog cordless telephone sets became popular first as cordless telephone sets. Thereafter, cordless telephone sets having various functions, mainly home cordless telephone sets, have been widely used. Some home cordless telephone sets allow the use of a plurality of subsidiary units and extension speech communication between subsidiary units through a master unit.

In performing inter-subsidiary-unit extension speech communication, at least two radio units have to be mounted in the master unit because radio speech channels have to be independently connected between the respective subsidiary units and the master unit.

Recently, in Japan as well, digital cordless telephone sets have been put into practice, and the standards (RCR STD-28) for the second-generation cordless telephone system have been established by (Foundation) Radio Wave System Development Center.

This second-generation cordless telephone system uses a four-channel multiplex time-division duplex (TDD) scheme. The above inter-subsidiary-unit extension speech communication can be realized by only one radio unit of the master unit, if the radio unit is compatible with four channels. The radio unit compatible with four channels, however, needs a frequency synthesizer capable of high-speed switching.

A cordless telephone system of this type is disclosed in Japanese Unexamined Patent Publication No. 1-136437. In this system, when a subsidiary unit is to call another subsidiary unit, an idle or non-busy speech channel is detected from a plurality of speech channels. Thereafter, the transmission frequency of the calling subsidiary unit is set to the reception frequency of the control channel of the called subsidiary unit, and the reception frequency of the calling subsidiary unit is set to the transmission frequency of the control channel of the called subsidiary unit. The pass bands of the two units are also switched accordingly. Information indicating the speech channel detected through the control channel is sent to the called subsidiary unit, thereby allowing extension speech communication between the calling subsidiary unit and the called subsidiary unit through the speech channel. In this scheme, even in speech communication between subsidiary units, speech channels are switched in accordance with an instruction from the master unit.

Another telephone system is disclosed in Japanese Unexamined Patent Publication No. 2-241129. In this system, when a subsidiary unit in a predetermined zone is to call an arbitrary subsidiary unit within the pertinent service area, a seizure signal and a start dial signal are exchanged between the calling subsidiary unit and the dedicated terminating master unit, and the two units are set in the same channel to be linked with each other. Thereafter, in response to the input of an extension number from the calling subsidiary unit, the extension number of the dedicated originating master unit in each zone is automatically dialed in the dedicated terminating master unit. With this operation, a dial signal corresponding to the extension number is transmitted to an exchange. The exchange then transmits ring back tone signals to the dedicated originating master unit in each zone and the calling subsidiary unit. When the ID code of the called subsidiary unit is input by the calling subsidiary unit, the ID code is transmitted to the dedicated originating master unit in each zone through the dedicated terminating master unit and the exchange. The ID code is then transmitted to the subsidiary units in each zone, and a start dial signal is generated. When a start dial signal is generated by the subsidiary unit corresponding to the ID code, the signal is received by the dedicated originating master unit in the corresponding zone. As a result, the dedicated originating master unit and the called subsidiary unit are set in the same channel to be linked with each other. In this manner, the calling subsidiary unit and the called subsidiary unit are connected to each other through the dedicated terminating master unit, the exchange, and the dedicated originating master unit, and speech communication between the subsidiary units is performed.

In this scheme as well, subsidiary units perform channel switching to a speech channel under the control of the master unit.

The radio unit compatible with four channels in the four-channel multiplex time-division duplex (TDD) scheme described above requires a frequency synthesizer capable of high-speed switching, and hence is expensive.

When the inter-subsidiary-unit direct communication function is to be used, inter-subsidiary-unit speech communication can be performed without equipping the master unit with a radio unit compatible with four channels. In this case, however, each subsidiary unit must detect an incoming call signal transmitted from the master unit to the self-unit through a control carrier, and an inter-subsidiary-unit direct speech communication mode must be set by performing a certain operation to perform inter-subsidiary-unit direct communication. For this reason, when inter-subsidiary-unit extension speech communication is to be performed by using the inter-subsidiary-unit direct communication function, two subsidiary units on the originating and terminating sides must be set in the inter-subsidiary-unit direct communication mode in advance upon verbal communication, or the subsidiary units must be capable of monitoring both a control carrier and an inter-subsidiary-unit communication carrier to achieve a successful call.

In the former case, the convenience of radio communication cannot fully be used. In the latter case, the battery power consumption increases as compared with the case wherein only a control carrier is intermittently received.

According to the inter-subsidiary-unit direct communication scheme based on the standards RCR STD-28, a calling subsidiary unit which is to start inter-subsidiary-unit direct speech communication selects an idle carrier from ten carriers assigned as radio carriers for inter-subsidiary-unit direct communication by carrier sense, and transmits a call signal including the ID code of the called subsidiary unit. Since a specific carrier, of the ten carriers, through which a call signal is to be transmitted, and a specific transmission timing cannot be specified, the called subsidiary unit must constantly and sequentially scan the ten carriers to check whether a call signal is transmitted. For this reason, an intermittent receiving operation cannot be efficiently performed. Consequently, the battery power consumption increases to disable a long-term operation. In addition, the time required for connection prolongs.

SUMMARY OF THE INVENTION

The present invention has been made in consideration of the above situation, and has as its object to provide a cordless telephone system which realizes a low cost, can save the battery power, and can shorten the time required for connection.

In order to achieve the above object, according to the main aspect of the present invention, there is provided a cordless telephone system comprising a master unit permanently connected to a wire telephone line, and a plurality of subsidiary units connected to the master unit by radio, one of the subsidiary units which serves as a calling subsidiary unit including means for transmitting a signal for requesting speech communication with another called subsidiary unit to the master unit through a radio channel which is monitored by the master unit, and means for transmitting a signal for calling the called subsidiary unit to the called subsidiary unit through a speech communication channel through which direct speech communication with the called subsidiary unit can be performed, the master unit including means for receiving the signal for requesting speech communication from the calling subsidiary unit and transmitting a signal for requesting direct speech communication between the subsidiary units to the called subsidiary unit through a radio channel which is monitored by the called subsidiary unit, and the called subsidiary unit including means, adapted to be started upon reception of the signal for requesting direct speech communication from the master unit, for receiving the signal for calling the called subsidiary unit from the calling subsidiary unit through the speech channel.

According to the main aspect described above, the signal requesting speech communication with the called subsidiary unit preferably includes ID information of the called subsidiary unit.

In addition, according to the main aspect, the means for receiving the signal for calling the called subsidiary unit through the radio channel can include means for searching a plurality of speech channels for the signal. Furthermore, according to the main aspect, the signal requesting speech communication with the called subsidiary unit can include information of a speech channel through which the signal for calling the called subsidiary unit is transmitted. Moreover, a digital radio communication system is preferably applied as a communication system for a cordless telephone system.

According to the present invention, when a given subsidiary unit is to perform extension speech communication with another subsidiary unit, the calling subsidiary unit informs the master unit of the ID information of the called subsidiary unit to call the called subsidiary unit through an inter-subsidiary-unit direct communication radio channel. The informed master unit performs a starting operation to allow inter-subsidiary-unit direction speech communication with respect to the subsidiary unit specified by the ID information. The called subsidiary unit detects the starting operation for inter-subsidiary-unit direction speech communication by the master unit, and detects a call signal for specifying the self-unit through an inter-subsidiary-unit direction speech communication radio channel, thereby performing speech communication between the subsidiary units.

In addition, a calling subsidiary unit informs the master unit of the information of an inter-subsidiary-unit direct communication radio channel used to specify and call a called subsidiary unit with which the calling subsidiary unit is to communicate, and the master unit informs the called subsidiary unit of the informed information. The called subsidiary unit then detects a call signal specifying the self-unit through the informed inter-subsidiary-unit direct communication radio channel. With this operation, speech communication between the subsidiary units can be performed.

A subsidiary unit, therefore, can be automatically switched to the inter-subsidiary-unit direct speech communication mode from the control radio channel sense mode without monitoring both a control radio channel of the master unit and an inter-subsidiary-unit direct communication radio channel. In addition, a scanning operation need not be performed with respect to inter-subsidiary-unit direct communication carriers. As a result, the battery power can be saved, and the time required for connection can be shortened.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 5 shows a sequence for explaining the transmission/reception states of signals in the embodiment of the present invention.

DETAILED DESCRIPTION OF THE PREFERRED EMBODIMENT

Figure 1:
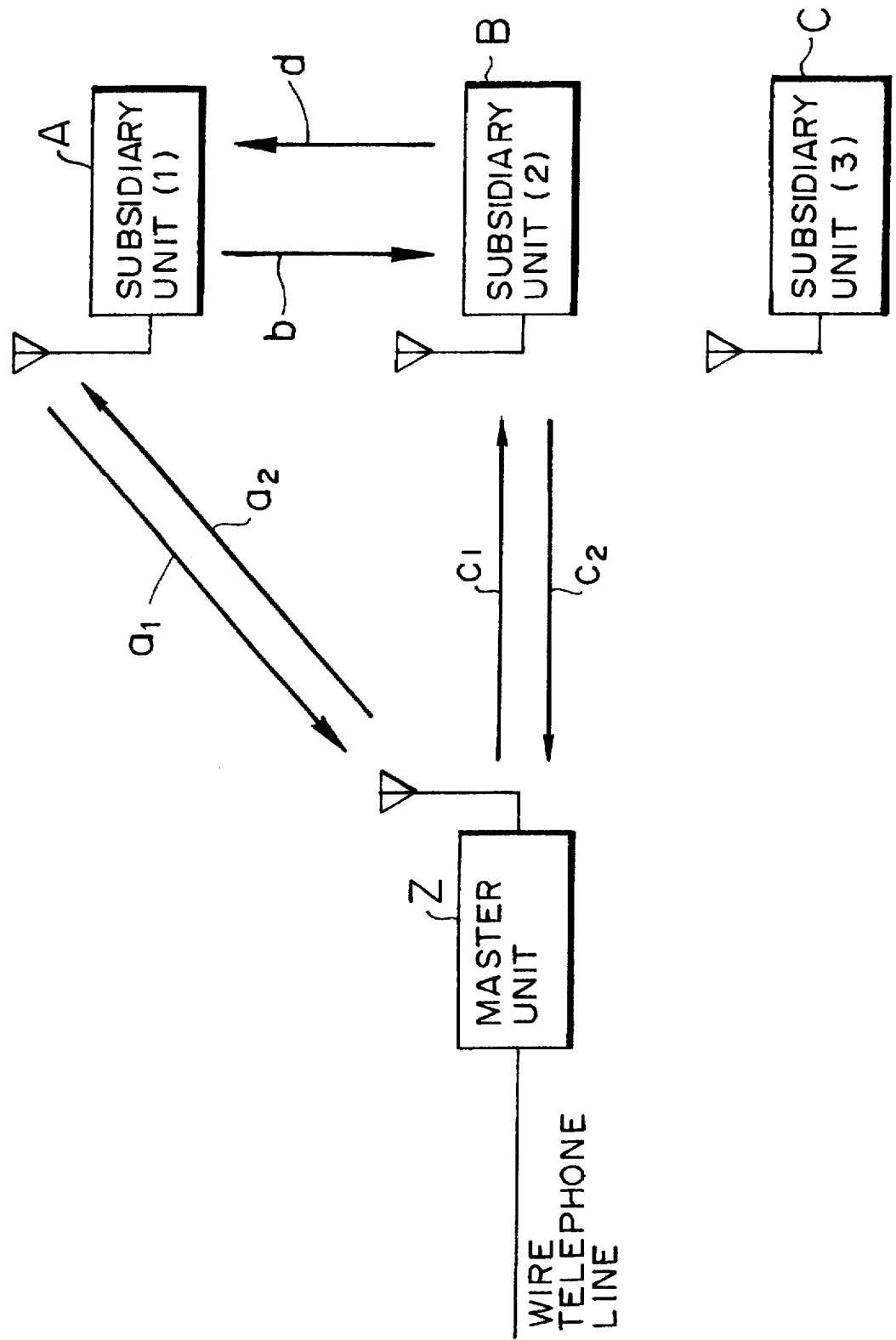
FIG. 1 is a block diagram showing the overall arrangement of an embodiment of the present invention.
Figure 2:
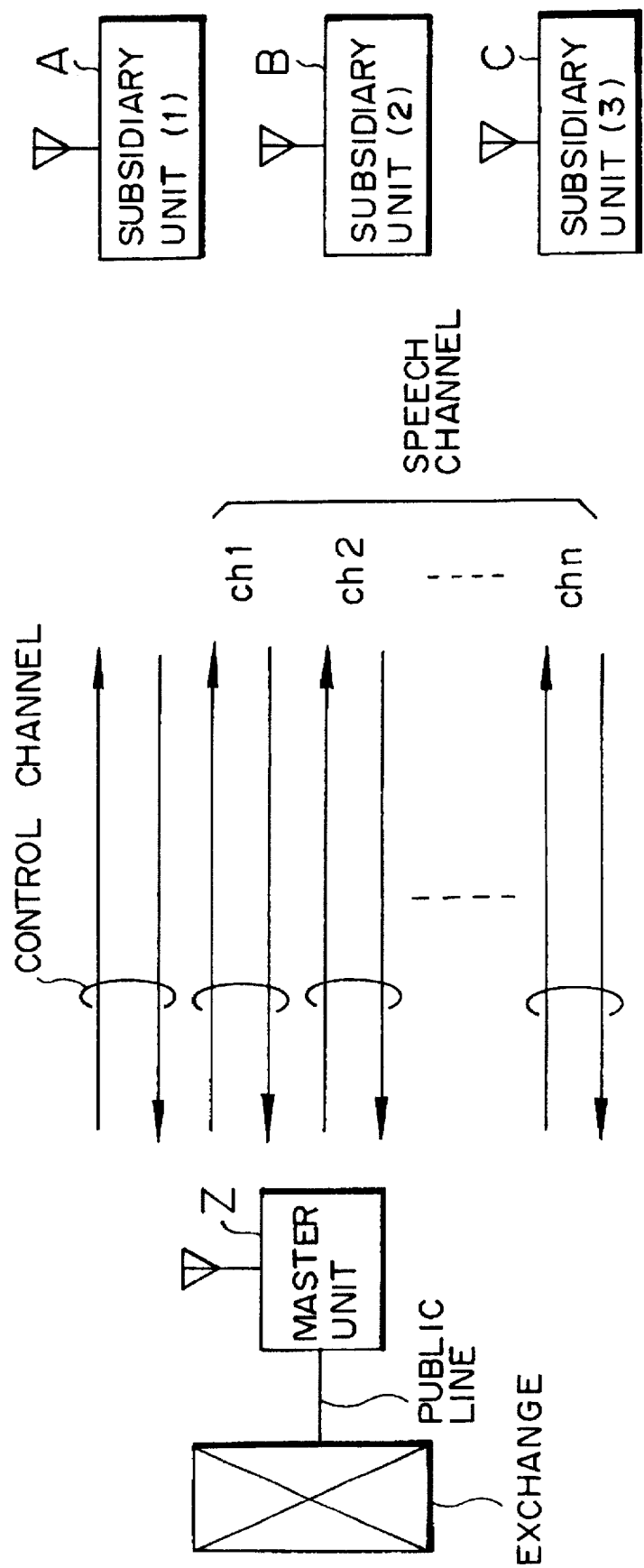
FIG. 2 illustrates the concept of channels in the embodiment of the present invention.
Figure 3:
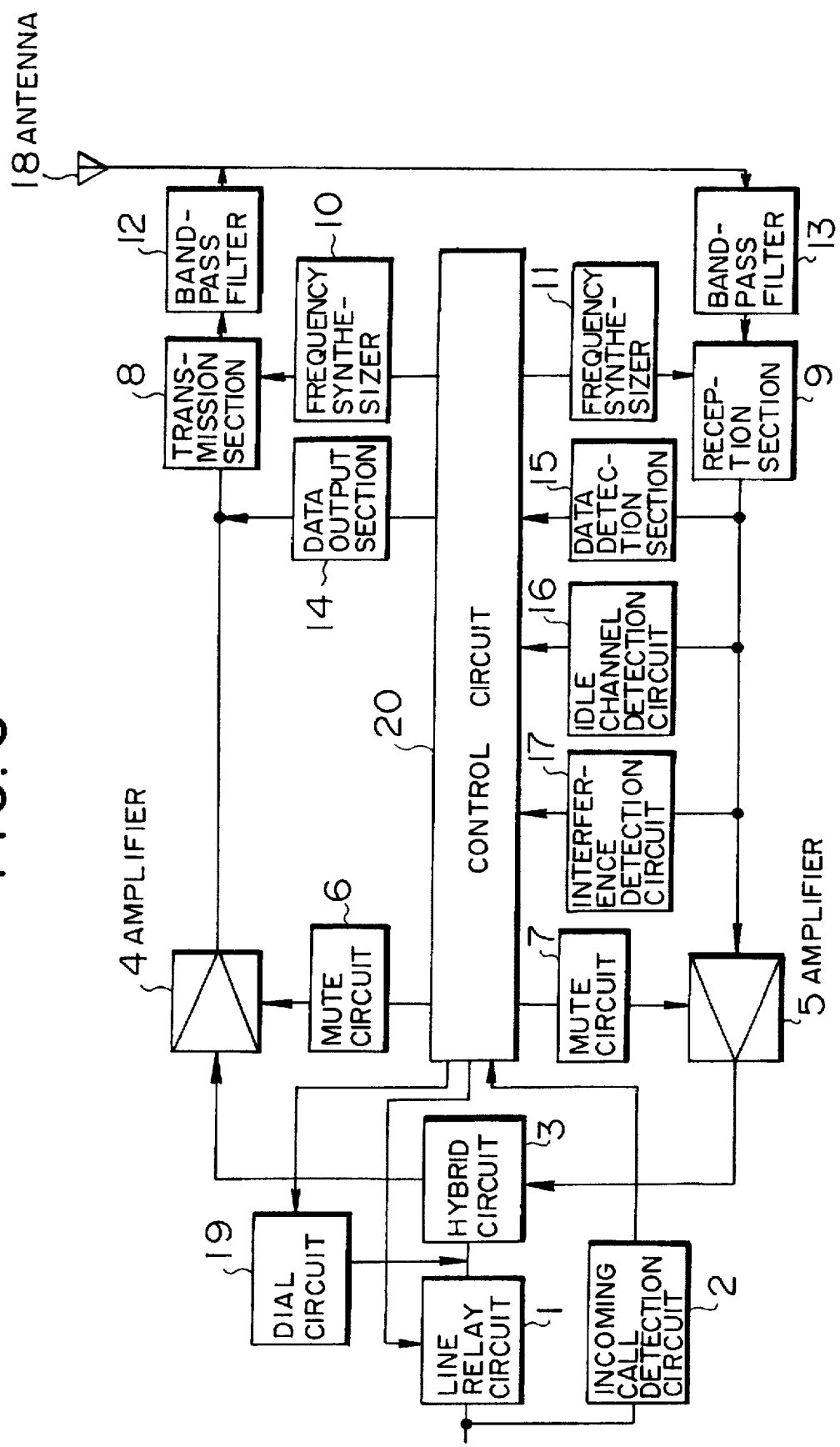
FIG. 3 is a block diagram showing the arrangement of a master unit in the embodiment of the present invention.
Figure 4:
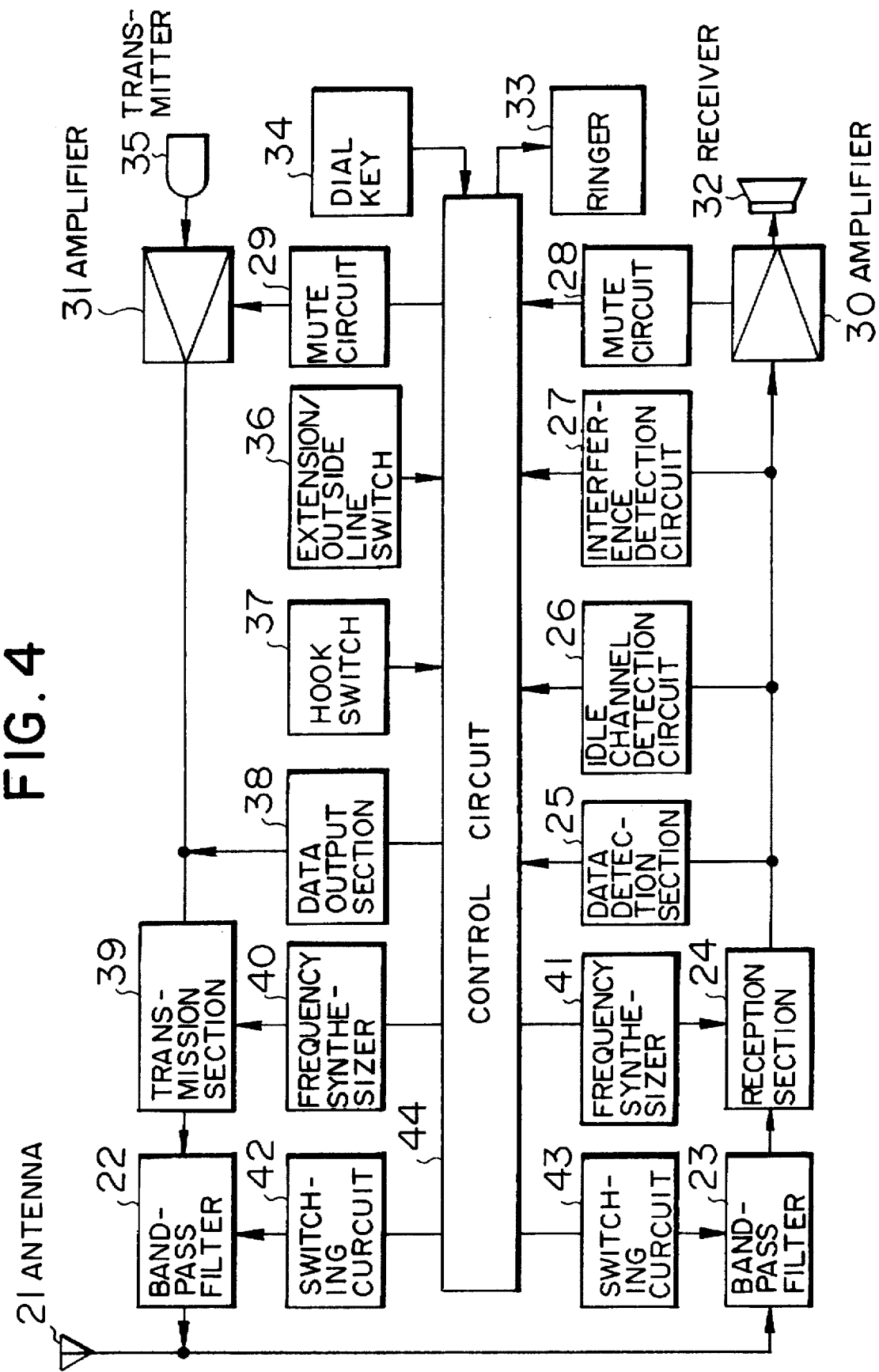
FIG. 4 is a block diagram showing the arrangement of a subsidiary unit in the embodiment of the present invention.

An embodiment of the present invention will be described next with reference to the accompanying drawings. FIG. 1 is a block diagram showing the overall arrangement of an embodiment of the present invention. FIG. 2 illustrates the concept of channels in the embodiment of the present invention. FIG. 3 is a block diagram showing the arrangement of a master unit in the embodiment of the present invention. FIG. 4 is a block diagram showing the arrangement of a subsidiary unit in the embodiment of the present invention.

As shown in FIG. 1, the embodiment of the present invention comprises a master unit Z permanently connected to a wire telephone line, and a plurality of subsidiary units A, B, and C connected to the master unit Z by radio. As shown in FIG. 2, the master unit Z designates a plurality of speech channels by using a control channel to establish two-way radio channels between the subsidiary units A, B, and C. While no speech communication is performed, the master unit Z and the subsidiary units A, B, and C are connected to each other through the control channel. In performing speech communication, switching to any one of the speech channels is performed.

As shown in FIG. 3, the master unit Z comprises a line relay circuit 1, an incoming call detection circuit 2, a hybrid circuit 3, amplifiers 4 and 5, mute circuits 6 and 7, a transmission section 8, a reception section 9, frequency synthesizers 10 and 11, bandpass filters 12 and 13, a data output section 14, a data detection section 15, an idle channel detection circuit 16, an interference detection circuit 17, an antenna 18, a dial circuit 19, and a control circuit 20.

As shown in FIG. 4, each of the subsidiary units A, B, and C comprises an antenna 21, bandpass filters 22 and 23, a reception section 24, a data detection section 25, an idle channel detection circuit 26, an interference detection circuit 27, mute circuits 28 and 29, amplifiers 30 and 31, a receiver 32, a ringer 33, a dial key 34, a transmitter 35, an extension/outside line switch 36, a hook switch 37, a data output section 38, a transmission section 39, frequency synthesizers 40 and 41, switching circuits 42 and 43, and a control circuit 44.

The present invention is characterized in that the control circuit 44 of each of the subsidiary units A, B, and C includes a means for, when the subsidiary unit is a calling subsidiary unit, transmitting a signal for requesting speech communication with another called subsidiary unit to the master unit Z through a radio channel which is monitored by the master unit Z, and a means for transmitting a signal for calling the called subsidiary unit to the called subsidiary unit through a speech channel through which direct speech communication with the called subsidiary unit can be performed. The control circuit 20 of the master unit Z includes means for receiving the signal for requesting speech communication from the calling subsidiary unit and transmitting a signal for requesting direct speech communication between the subsidiary units to the called subsidiary unit through a radio channel which is monitored by the called subsidiary unit. The control circuit 44 further includes a means which is started upon reception of a signal for requesting direct speech communication from the master unit Z, and receives a signal for calling the called subsidiary unit from the calling subsidiary unit. The signal for requesting speech communication with the called subsidiary unit includes the ID information of the called subsidiary unit.

First Exemplified Embodiment

In addition to the above basic arrangement, the first exemplified embodiment includes a means for receiving a signal for calling a called subsidiary unit through a speech channel, and a means for searching a plurality of speech channels for the signal. These means are arranged in the control circuit 44 of each of the subsidiary units A, B, and C.

The basic operation of the first exemplified embodiment of the present invention will be described next with reference to FIG. 1.

The master unit Z is connected to a fixed telephone network and a wire telephone line, and the subsidiary units A, B, and C can perform communication with the master unit Z through digital cordless telephone radio channels. In addition, subsidiary unit numbers corresponding to extension numbers are assigned to the subsidiary units A, B, and C in advance to discriminate them for a call operation. For example, 1, 2, and 3 are respectively assigned as subsidiary unit numbers to the subsidiary units A, B, and C.

In general, each of the subsidiary units A, B, and C is monitoring the control channel for an incoming call signal to be transmitted from the master unit Z to the self-unit.

An operation to be performed when the subsidiary unit A tries to perform inter-subsidiary-unit extension speech communication with the subsidiary unit B will be described below.

When the extension originating button and the key corresponding to the subsidiary unit number of the called subsidiary unit B are depressed, the subsidiary unit A as a calling subsidiary unit transmits an extension speech communication request signal "$a_1$" including the subsidiary unit number of the subsidiary unit B to the master unit Z. When this extension speech communication request signal "$a_1$" is received, the subsidiary unit A starts transmitting an inter-subsidiary-unit direct communication call signal "b" including the subsidiary unit number of the subsidiary unit B to the subsidiary unit B through an idle inter-subsidiary-unit direct communication channel. The subsequent operation is performed in the same manner as in inter-subsidiary-unit direct communication specified by the standards RCR STD-28 for the second-generation cordless telephone system.

Upon reception of the extension speech communication request signal "$a_1$" from the subsidiary unit A, the master unit Z transmits an extension speech communication start signal "$c_1$" including the subsidiary unit number to the subsidiary unit B through the control channel.

Upon reception of the extension speech communication start signal "$c_1$" including the subsidiary unit number of the subsidiary unit B, the subsidiary unit B performs the same operation as that in the inter-subsidiary-unit direct speech communication specified in the standards RCR STD-28. That is, the subsidiary unit B sequentially switches the radio unit to the ten carriers assigned for the inter-subsidiary-unit direct communication to check whether an inter-subsidiary-unit direct speech communication call signal "b" transmitted from the subsidiary unit A is received. Upon reception of the inter-subsidiary-unit direct speech communication call signal "b" transmitted to the subsidiary unit B, the subsidiary unit B generates a ringing tone and waits for a response button operation. The subsidiary unit B then transmits an inter-subsidiary-unit direct communication response signal "d" to the subsidiary unit A and is set in a communication state.

In this case, even if the extension speech communication start signal "c" is received by the subsidiary unit C, since the subsidiary unit number "2" included in the signal is different from "3" as the subsidiary unit number of the subsidiary unit C, the subsidiary unit C does not operate.

A sequence chart for explaining the transmission/reception states of signals in the first exemplified embodiment of the present invention is shown in FIG. 5.

Second Exemplified Embodiment

In addition to the above basic arrangement, in the second exemplified embodiment, the signal requesting speech communication with a called subsidiary unit includes the information of a speech channel for transmitting a signal for calling the called subsidiary unit.

The second exemplified embodiment differs from the first exemplified embodiment as follows. Before the subsidiary unit A transmits an extension speech communication request signal "$a_1$" shown in FIG. 1 to the master unit Z, the subsidiary unit A selects an idle carrier from the inter-subsidiary-unit direct speech communication carriers by carrier sense, and transmits an extension speech communication request signal "$a_1$" to the master unit Z with the idle carrier number being included in the signal "$a_1$". The subsidiary unit A then starts transmitting an inter-subsidiary-unit direct communication call signal "b" to the subsidiary unit B through the selected carrier. The master unit Z transmits an extension speech communication start signal "$c_1$" to the subsidiary unit B with the carrier number transmitted from the subsidiary unit A being included in the signal "$c_1$". In addition, the subsidiary unit B monitors the inter-subsidiary-unit speech communication carrier designated by the carrier number included in the extension speech communication start signal "$c_1$" and sent from the master unit Z to detect the inter-subsidiary-unit direct communication call signal "b" from the subsidiary unit A without sequentially switching the inter-subsidiary-unit direct speech communication carriers. The sequence chart shown in FIG. 5 expresses the above operation in conformity with the expression of the standards RCR STD-28. The extension speech communication request signal "$a_1$", the extension speech communication confirmation signal $a_2$, the extension speech communication start signal "$c_1$", and the extension speech communication start confirmation signal $c_2$ which are exchanged between the master unit and the subsidiary units are defined as link channel establishment phase signals in the standards RCR STD-28 by using an option area.

The messages to be exchanged between the subsidiary units and the sequences are the same as those for inter-subsidiary-unit direct speech communication specified by the standards RCR STD-28.

What is claimed is:

1. A cordless telephone system comprising a master unit connected to a wire telephone line, and a plurality of subsidiary units in communication with said master unit by radio, one of said subsidiary units which serves as a calling subsidiary unit including means for transmitting a signal for requesting speech communication with another called subsidiary unit to said master unit through a radio channel which is monitored by said master unit, and means for transmitting a signal for calling said called subsidiary unit to said called subsidiary unit through a speech communication channel through which direct speech communication with said called subsidiary unit can be performed, said master unit including means for receiving the signal for requesting speech communication from said calling subsidiary unit and transmitting a confirmation signal to said calling subsidiary unit, said master unit transmitting a signal for requesting direct speech communication between said subsidiary units to said called subsidiary unit through a radio channel which is monitored by said called subsidiary unit, and said called subsidiary unit including means, adapted to be started upon reception of the signal for requesting direct speech communication from said master unit, for receiving the signal for calling said called subsidiary unit from said calling subsidiary unit through the speech communication channel, wherein said calling subsidiary unit transmits the signal for calling said called subsidiary unit to said called subsidiary unit through the speech communication channel immediately upon receipt of the confirmation signal sent by said master unit to said calling subsidiary unit.

2. A system according to claim 1, wherein the signal requesting speech communication with said called subsidiary unit includes ID information of said called subsidiary unit.

3. A system according to claim 1, wherein said means for receiving the signal for calling said called subsidiary unit through the radio channel includes means for searching a plurality of speech communication channels for the signal.

4. A system according to claim 2, wherein said means for receiving the signal for calling said called subsidiary unit through the radio channel includes means for searching a plurality of speech communication channels for the signal.

5. A system according to claim 1, wherein the signal requesting speech communication with said called subsidiary unit includes information of a speech communication channel through which the signal for calling said called subsidiary unit is transmitted.

6. A system according to claim 2, wherein the signal requesting speech communication with said called subsidiary unit includes information of a speech communication channel through which the signal for calling said called subsidiary unit is transmitted.

7. A system according to claim 1, wherein the cordless telephone system is a digital radio communication system.

8. A cordless telephone system comprising a master unit connected to a wire telephone line, and a plurality of subsidiary units in communication with said master unit by radio, a first unit of said subsidiary units including a transmitter configured to transmit a first signal to said master unit for requesting speech communication with a second unit of said subsidiary units through a radio channel which is monitored by said master unit, said transmitter configured to transmit a second signal to said second subsidiary unit for calling said second subsidiary unit through a speech communication channel through which direct speech communication with said second subsidiary unit can be performed, said master unit including a receiver configured to receive the first signal from said first subsidiary unit and a transmitter configured to transmit a confirmation signal to said first subsidiary unit, said transmitter of said master unit configured to transmit a third signal to said second subsidiary unit for requesting direct speech communication between said first and second subsidiary units, the third signal being sent through a radio channel which is monitored by said second subsidiary unit, and said second subsidiary unit including a receiver, adapted to be started upon reception of the third signal, and configured to receive the second signal through the speech communication channel, wherein said first subsidiary unit transmits the second signal through the speech communication channel immediately upon receipt of the confirmation signal.

9. A system according to claim 8, wherein the first signal includes ID information of said second subsidiary unit.

10. A system according to claim 8, wherein said receiver of said second subsidiary unit performs a frequency sweep of a plurality of speech communication channels in order to search for the second signal.

11. A system according to claim 8, wherein the first signal includes information of a speech communication channel through which the second signal is transmitted.

12. A method for providing speech communication between a first subsidiary unit and a second subsidiary unit, in a system having a master unit connected to a telephone line, the first and second subsidiary units being in communication with said master unit by radio, the method comprising the steps of:

a) transmitting, from said first subsidiary unit to said master unit, a signal for requesting speech communication with said second subsidiary unit;

b) receiving, at said master unit, the signal sent in the step a), and transmitting a confirmation signal from said master unit to said first subsidiary unit;

c) receiving, at said first subsidiary unit, the confirmation signal, and transmitting a speech communication signal from said first subsidiary unit to said second subsidiary unit;

d) transmitting, from said master unit to said second subsidiary unit, a signal for requesting direct speech communication between said first and second subsidiary units;

e) receiving, at said second subsidiary unit, the signal sent at the step d); and f) commencing direct communication between said first and second subsidiary units.

13. A method according to claim 12, wherein said second subsidiary unit has a receiver for receiving communications from said first subsidiary unit which is turned off until receipt of the signal in the step e).

14. A method according to claim 13, wherein said first subsidiary unit continuously transmits the speech communication signal to said second subsidiary unit during the steps c) through e) even while the receiver of said second subsidiary unit is turned off.

* * * * *

UNITED STATES PATENT AND TRADEMARK OFFICE
CERTIFICATE OF CORRECTION

PATENT NO. : 5,699,409
DATED : December 16, 1997
INVENTOR(S) : Susumu Kojima

It is certified that error appears in the above-identified patent and that said Letters Patent is hereby corrected as shown below:

Please note and correct on Sheet 4, FIG 4, Blocks 42 and 43, contains typographical errors, delete "SWITCHING CURCUIT" and insert --SWITCHING CIRCUIT--.

Signed and Sealed this

Thirtieth Day of June, 1998

*Attest:*

BRUCE LEHMAN

*Attesting Officer*        *Commissioner of Patents and Trademarks*